United States Patent [19]
Watanabe et al.

[11] Patent Number: 5,784,343
[45] Date of Patent: Jul. 21, 1998

[54] MAGNETO-OPTICAL RECORDING AND/OR REPRODUCING APPARATUS HAVING A PLURALITY OF OPTICAL SYSTEMS

[75] Inventors: Tetsu Watanabe, Tokyo; Tamotsu Yamagami, Kanagwa, both of Japan

[73] Assignee: Sony Corporation, Tokyo, Japan

[21] Appl. No.: 761,755

[22] PCT Filed: Jan. 30, 1991

[86] PCT No.: PCT/JP91/00112
§ 371 Date: Sep. 16, 1991
§ 102(e) Date: Sep. 16, 1991

[87] PCT Pub. No.: WO91/11806
PCT Pub. Date: Aug. 8, 1991

[30] Foreign Application Priority Data
Jan. 31, 1990 [JP] Japan .................. 2-21211

[51] Int. Cl.$^6$ .................. G11B 11/14; G11B 13/04
[52] U.S. Cl. .................. 369/13; 360/114
[58] Field of Search .................. 369/13, 14, 111; 360/114, 59

[56] References Cited

U.S. PATENT DOCUMENTS

| | | | |
|---|---|---|---|
| 4,447,899 | 5/1984 | Geyer et al. | 369/111 |
| 4,803,674 | 2/1989 | Nakao et al. | 369/13 |
| 4,807,204 | 2/1989 | Mizutani et al. | 360/59 |
| 4,922,454 | 5/1990 | Taki | 369/13 |
| 5,022,018 | 6/1991 | Vogelgesang | 369/13 |
| 5,051,970 | 9/1991 | Ishii et al. | 369/13 |
| 5,124,961 | 6/1992 | Yamaguchi et al. | 369/13 |
| 5,150,338 | 9/1992 | Birecki et al. | 369/13 |
| 5,197,050 | 3/1993 | Murakami et al. | 369/13 |

FOREIGN PATENT DOCUMENTS 0 341 829  11/1989  European Pat. Off. .

*Primary Examiner*—Hoa T. Nguyen
*Attorney, Agent, or Firm*—Frommer Lawrence & Haug LLP; William S. Frommer

[57] ABSTRACT

A magneto-optical recording and/or reproducing apparatus having a magnetic head and first and second optical systems for recording on and/or reproducing from first and second magneto-optical media. The first optical system has a first objective lens, and the second optical system has a second objective lens whose numerical aperture differs from that of the first objective lens. The magnetic head is arranged near the second objective lens. The first and second optical systems are arranged such that the respective one of the first and second magneto-optical media which is currently being subject to recording or reproducing is positioned between the first and second optical systems.

13 Claims, 4 Drawing Sheets

MAGNETO-OPTICAL RECORDING AND/OR REPRODUCING APPARATUS HAVING A PLURALITY OF OPTICAL SYSTEMS

TECHNICAL FIELD

The present invention relates to a magneto-optical recording and/or reproducing apparatus for recording information signals in and/or reproducing information signals from a magneto-optical recording medium due to magneto-optical effect such as magnetic Kerr effect or Faraday effect.

BACKGROUND ART

The optical modulation scheme and the magnetic field modulation scheme are known as to recording in magneto-optical recording media. An overwrite operation can be performed according to the magnetic field modulation scheme.

A schematic arrangement of a conventional magneto-optical recording and/or reproducing apparatus due to the magnetic field modulation scheme is shown in FIG. 1.

Referring to FIG. 1, the magneto-optical recording and/or reproducing apparatus is arranged such that when a magneto-optical recording medium 50 is mounted, an optical system including a laser unit 58 and an objective lens 59 is arranged below the magneto-optical recording medium 50, and a magnetic field generating unit 60 serving as a magnetic system is arranged above the magneto-optical recording medium. The objective lens 59 has a numerical aperture (to be referred to as an NA hereinafter) falling within the range of about 0.5 to 0.53.

In the magnetic field modulation scheme, a high-speed reverse control of a magnetic field is required in accordance with information signals supplied to a magnetic field generating unit, so that a sufficiently large excitation current cannot be obtained, and the intensity of the generated magnetic field is limited. For this reason, the magnetic field generating unit 60 is arranged near a magnetic recording layer 53 provided in the magneto-optical recording medium 50. In general, the magnetic field generating unit 60 is positioned near a side of the magneto-optical recording medium 50, where a protective cover 56 is formed, and face the objective lens 59 arranged near the other side of the recording medium 50 as shown in FIG. 1.

The magneto-optical recording medium 50 is formed as follows. A dielectric layer 52, a magnetic recording layer 53 having a large magneto-optical effect and made of, e.g., a rare earth element-transition metal alloy amorphous thin film, a dielectric film 54, a reflecting layer 55, a protective cover 56 are sequentially stacked on one surface of a transparent substrate 50 made of, e.g., polycarbonate. The thickness of the substrate 51 is generally set to be 1.2 mm.

An operation of the magneto-optical disc system will be described below.

The magneto-optical recording medium 50 is placed on and driven by a rotary disc (not shown), and a magnetic field from the magnetic field generating unit 60 is applied to the magnetic recording layer 53 of the magneto-optical recording medium 50. A high-speed reverse control of the applied magnetic field is performed in response to information signals to be recorded as described before. A laser beam emitted by the laser unit 58 is bundled or focused on the magnetic recording layer 53 by the objective lens 59, where the magnetic field is applied. The direction of magnetization is changeable in a region of the magnetic recording layer 53 irradiated by the focused laser beam, so that an overwrite operation of information signals can be performed in real time.

In order to record information in high density in the magneto-optical recording medium and, thereby, increase its recording capacity, it is assumed that a laser beam is focused on the magneto-optical recording medium by an objective lens for the spot to be made as small as possible. For this purpose, the NA of the objective lens in the optical system must be increased. The increase of the NA, however, poses the following problem.

The objective lens in the optical system is subjected to correction of spherical aberration $W_{40}$ represented by the following equation:

$$W_{40} = t/8 \cdot ((N^2-1)/N^3) NA^4 \quad (1)$$

(t: thickness of transparent substrate of magneto-optical recording medium; N: refractive index of transparent substrate of optical storage recording medium)

The spherical aberration of an objective lens having a large NA is also corrected due to equation (1). The correction value is different from that of the conventional objective lens since the numerical aperture NA and the thickness t are changed in the equation as though the refractive index N is kept constant. In an optical system having such an objective lens as to have been corrected for the NA to be larger, recording in and/or reproduction from the conventional magneto-optical recording medium cannot be performed.

As the NA is larger, the thickness of the objective lens increases, so that the distance (working distance) between the objective lens and the surface of the magneto-optical recording medium is shortened. For this reason, with an increase of the NA, the thickness t must be set smaller than the conventional thickness (e.g., 1.2 mm).

Thus, a magneto-optical recording and/or reproducing apparatus comprising an optical system having an objective lens, whose NA is increased in order to perform recording in higher density, cannot cope with recording in and/or reproduction from the conventional magneto-optical recording medium, because they are not compatible with each other. It is inconvenience to practical appliance.

DISCLOSURE OF INVENTION

It is, therefore, an object of the present invention to provide a magneto-optical recording and/or reproducing apparatus capable of recording in and/or reproducing from any of a plurality of magneto-optical recording media, even if they are different one another in recording density.

In order to accomplish the above object, there is provided a magneto-optical recording and/or reproducing apparatus comprising a first optical system having a first objective lens for recording in and/or reproducing from a first magneto-optical recording medium, a second optical system having a second objective lens arranged to face the first objective lens and having a numerical aperture different from that of the first objective lens so as to be capable of recording in and/or reproducing from a second magneto-optical recording medium, and a magnetic head arranged close to the second objective lens of the second optical system, wherein at a time when one of the first and second magneto-optical recording media is subjected to recording or reproduction, the recording medium is located between the first optical system and the second optical system.

In the arrangement described above, the first and second magneto-optical recording media have different recording densities in correspondence with the difference of the numerical aperture between the first and second objective lenses. For example, if the numerical aperture of the second objective lens is set larger than that of the first objective lens, the second magneto-optical recording medium has a larger recording density. Recording in and/or reproducing from the first magneto-optical recording medium can be performed by the first optical system, and the second magneto-optical recording medium is dealt with the second optical system. As the magnetic head is arranged near the second objective lens, the head can be used in common upon recording in the first magneto-optical recording medium and the second magneto-optical recording medium.

Either of the first magneto-optical recording medium and the second magneto-optical recording medium are arranged between the first optical system and the second optical system so as to be able to perform recording and/or reproduction.

BEST MODE OF CARRYING OUT THE INVENTION

An embodiment of the present invention will be described with reference to FIGS. 2 to 4.

Figure 2:
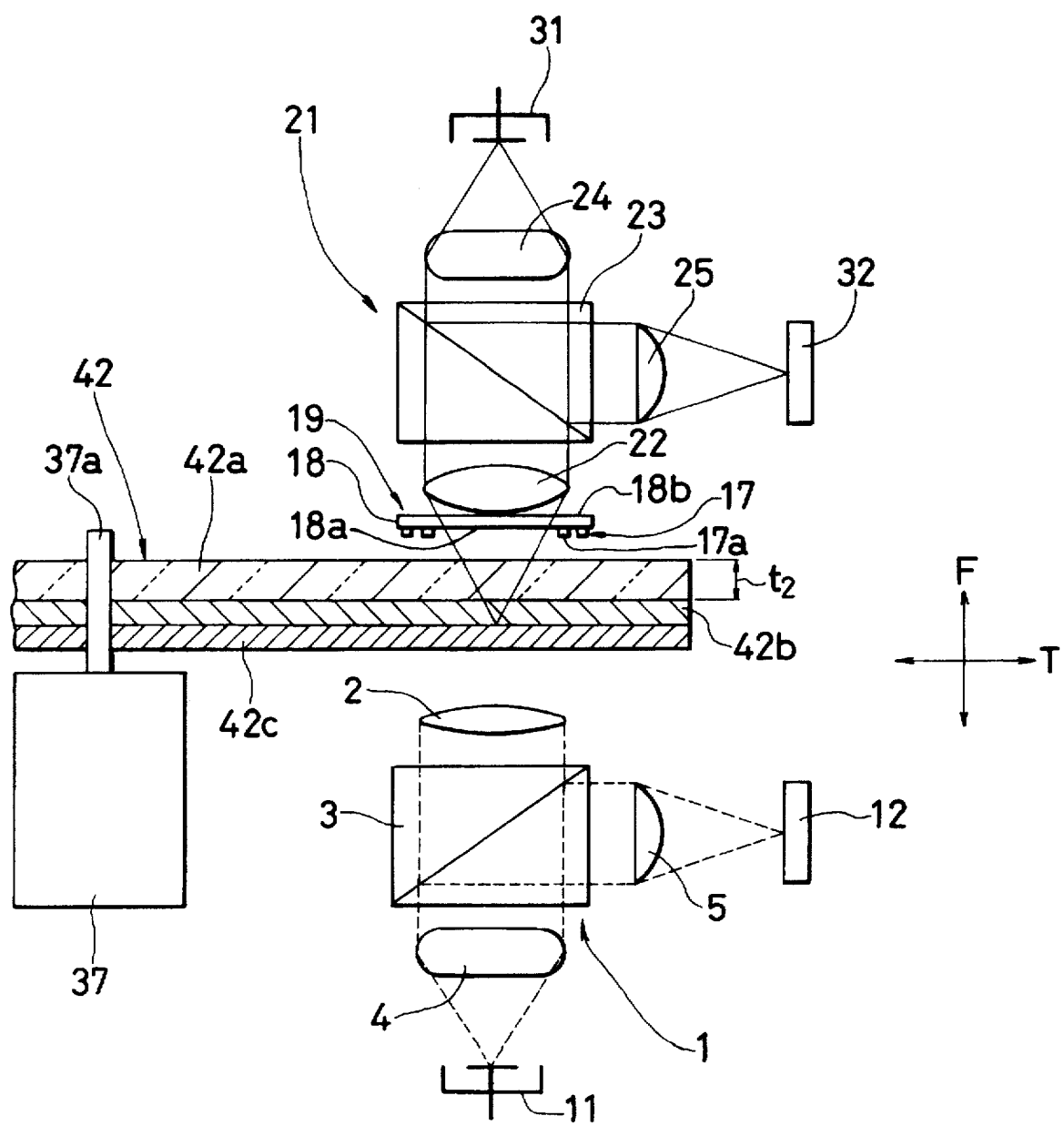
FIG. 2 is a schematic sectional view of a magneto-optical recording and/or reproducing apparatus for recording in or reproducing from a second magneto-optical recording medium according to an embodiment of this invention.
Figure 3:
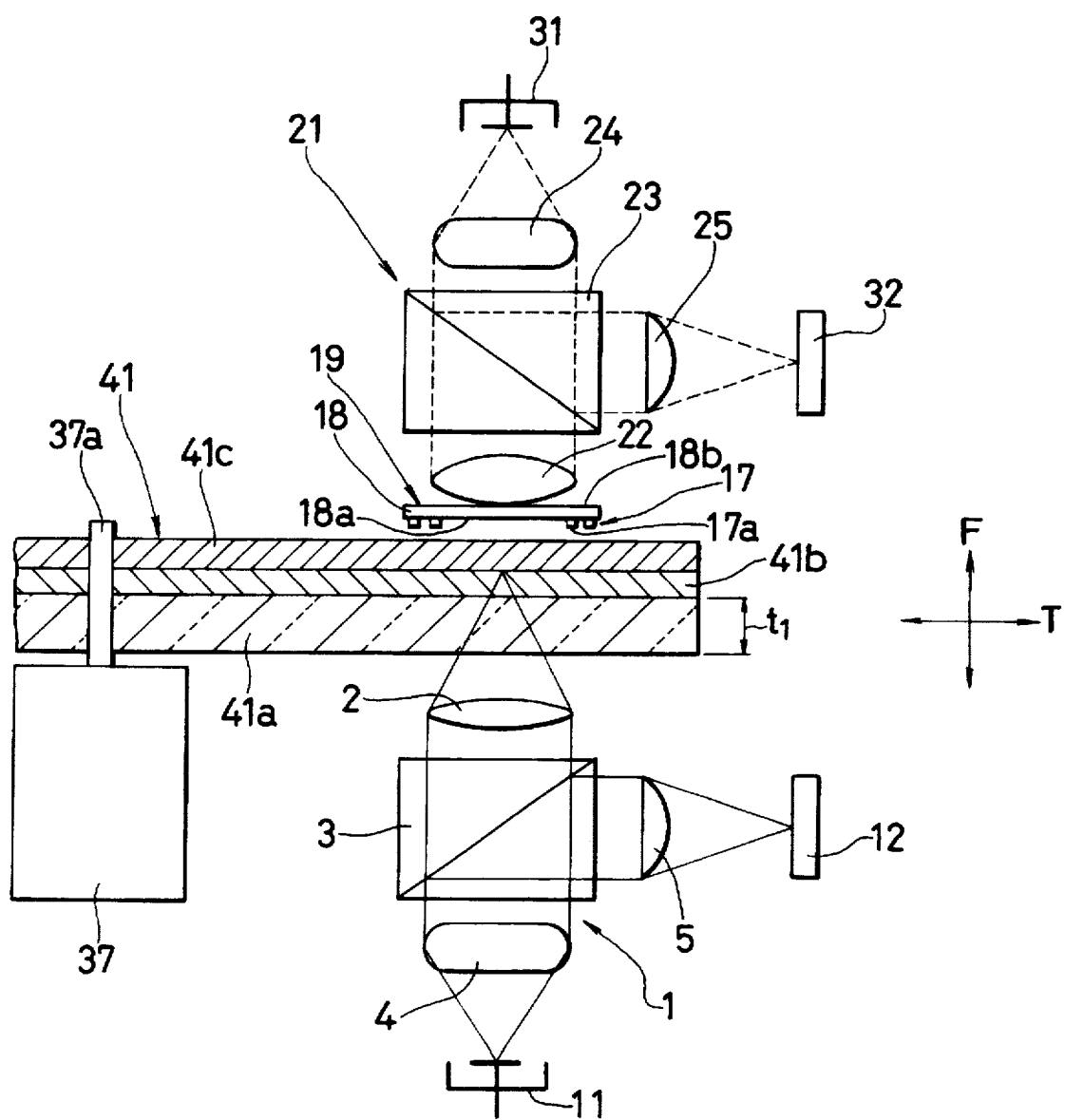
FIG. 3 is a sectional view of the magneto-optical recording and/or reproducing apparatus of FIG. 2, when recording in or reproducing from the first magneto-optical recording medium is performed.

FIGS. 2 and 3 are schematic sectional views of an embodied magneto-optical recording and/or reproducing apparatus.

The magneto-optical recording and/or reproducing apparatus shown in FIGS. 2 and 3 comprises a first optical system 1, a first drive system (not shown) for driving the first optical system 1, a second optical system 21 with a magnetic head 19 constituting a magnetic system, a second drive system (not shown) for driving the second optical system 21, and a spindle motor 37 having a rotating shaft 37a to rotate a disc-like magneto-optical recording medium. In the embodied magneto-optical recording and/or reproducing apparatus, two magneto-optical pickup units, each of which comprises the optical system, the magnetic system, and the drive system, are vertically arranged on opposite sides of the magneto-optical recording medium so as to face each other as shown in FIGS. 2 and 3.

An overwrite operation can be performed in the embodied magneto-optical recording and/or reproducing apparatus under the magnetic field modulation scheme.

The first optical system 1 comprises a first objective lens 2 for focusing a laser beam, a polarizing beam splitter 3, a collimator lens 4, a cylindrical lens 5, a laser diode 11, and a photodetector 12. As a matter of course, the first objective lens 2 is driven in a focusing direction (indicated by letter F in FIG. 2) and in a tracking direction (indicated by letter T in FIG. 2) by drive means (not shown) in response to the focusing signals and tracking error signals detected by the photodetector 12, respectively. The first optical system 1 is driven in a radius direction of the disc-like magneto-optical recording medium as its feed is controlled. Another method or means may be used to control the motion along the tracking direction.

The first optical system 1 is arranged to record in and/or reproduce from a first magneto-optical recording medium 41 comprising a transparent substrate 41a having the thickness $t_1$ of 1.2 mm, a magneto-optical (denoted by MO) layer 41b, and a protective cover 41c as shown in FIG. 3.

The NA of the first objective lens 2 is set to fall within the range of about 0.50 to 0.53, and the spherical aberration correction is made in the light of equation (1).

The second optical system 21 comprises a second objective lens 22 arranged to face the first objective lens 2 and focus a laser beam, a polarizing beam splitter 23, a collimator lens 24, a cylindrical lens 25, a laser diode 31, and a photodetector 32. The objective lens 22 of the second optical system 21 is freely driven along the directions F and T in FIG. 2 like the objective lens 2 of the first optical system 1.

As shown in FIGS. 2 and 3, in the second optical system, the magnetic head 19 is positioned between the objective lens 22 and the magneto-optical recording medium mounted in the magneto-optical recording and/or reproducing apparatus. The magnetic head 19 is in contact with the second objective lens 22, but not in contact with the magneto-optical recording medium.

The magnetic head 19 is positioned on a side of the magneto-optical recording medium, where the protective cover 41c is provided at a time when the first magneto-optical recording medium 41 is mounted, and is positioned on a side of the magneto-optical recording medium, where a thinner transparent substrate 42a is provided at a time when a second magneto-optical recording medium 42 (to be described later) is mounted. Therefore, the magnetic head 19 can be always located nearer MO layer 41b, 42b, and it is desirable in view of the magnetic field efficiency.

The second optical system 21 is arranged to record in and/or reproduce from the second magneto-optical recording medium, which comprises the transparent substrate 42a having a thickness $t_2$ (FIG. 2) of 1.2 mm or less, the MO layer 42b, and a protective cover 42c.

The NA of the second objective lens 22 is larger than that of the first objective lens 2 and falls within the range of about 0.55 to 0.7 for example, and the spherical aberration correction is made in the light of equation (1). High-density recording and/or reproduction can thus be performed due to the second optical system 21 and the second magneto-optical recording medium 42.

Figure 4:
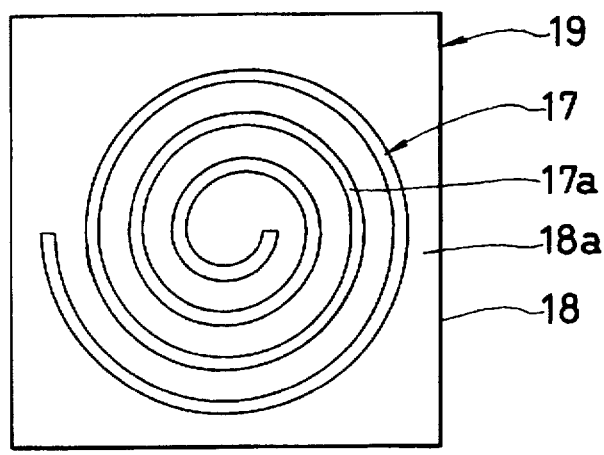
FIG. 4 is a front view of a magnetic head having a coil pattern which can be used in the magneto-optical recording and/or reproducing apparatus of FIG. 1.

FIG. 4 is a detail plan view of the magnetic head 19. As shown in FIG. 4, the magnetic head 19 comprises a light-transmitting glass 18 made of quartz or the like, and a coil 17 made of a conductor 17a of a spiral pattern, which is provided in one surface 18a of the glass 18 so as to produce a magnetic field due to high frequency currents in response to information signals. In the other surface 18b of the optical glass 18, in which there exists no coil pattern 17, the magnetic head 19 and the second objective lens 22 are stuck to a bobbin (not shown) in such a manner that the center of the coil pattern 17 is aligned with that of the second objective lens 22.

Quartz is merely one example of the material for the optical glass 18. Any material can be used if it is a light-transmitting material. For example, a printed coil, a thin film coil, or the like may be used for the coil pattern 17. A hole may be formed in the optical glass 18 to transmit the laser beam emitted by the laser diode 31 in order to prevent reflection on the surface of the optical glass 18.

Figure 1:
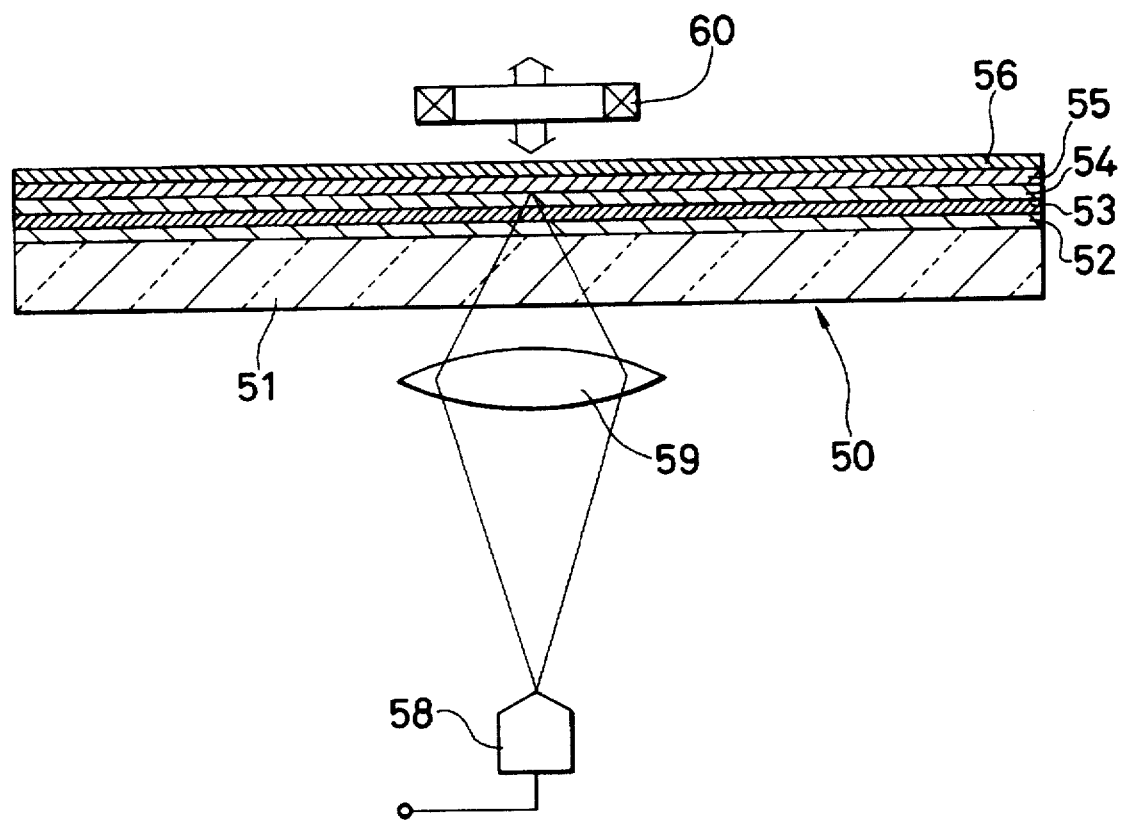
FIG. 1 is a schematic sectional view of a conventional magneto-optical recording and/or reproducing apparatus.

Each of the MO layers 41b and 42b of the first and second magneto-optical recording media 41 and 42 may comprise a dielectric layer, a magnetic recording layer, and a reflecting layer as shown in FIG. 1. The MO layer may have another structure coping with magneto-optical recording.

The function of the apparatus will be described below and recording in the first magneto-optical recording medium 41 will be firstly described.

As shown in FIG. 3, the magneto-optical recording medium 41 is mounted in such a manner that the transparent substrate 41a thereof faces the first optical system 1. The magneto-optical recording medium 41 is rotated by the spindle motor 37. The first objective lens 2 of the first optical system 1 is driven by a first drive system (not shown) to be displaced in the focusing direction of arrow F in FIG. 3, in the optical axis direction of the first objective lens 2 as previously stated. Thus, the first objective lens 2 follows surface swerves occurring during rotation of the magneto-optical recording medium 41. A laser beam by the laser diode 11 traces a recording track of the magneto-optical recording medium 41, when the first objective lens 2 is driven to be displaced in the tracking direction, in a direction perpendicular to the optical axis of the objective lens 2, as indicated by arrow T in FIG. 3. Further, the magnetic head 19 of the second optical system 21 is driven by a second drive system (not shown) to be displaced in synchronism with the motion of the first objective lens 2 of the first optical system in the directions F and T. The magnetic head 19 can be driven as a result of supplying focusing error signals and tracking error signals detected by the photodetector 12 of the first optical system 1 to the second drive system. The polarity of the focusing error signal is inverted, and the inverted signal is sent to the drive system, while the tracking error signal is directly supplied to the drive system. Thus, the magnetic head 19 is controlled to be displaced to follow the surface swerve and the eccentricity of the magneto-optical recording medium 41, so that a predetermined magnetic field can always be applied to the MO layer 41b of the magneto-optical recording medium 41.

At the same time, a high-frequency current signal obtained by amplifying a signal to be recorded is supplied to the coil pattern 17 of the magnetic head 19, which comprises the conductor 17a, and thereby, a magnetic field is produced. This magnetic field is modulated in response to the recording signal and inverted at high speed. The magnetic field is applied to the MO layer 41b of the first magneto-optical recording medium 41 through the protective cover 41c. A laser beam radiated from the laser diode 11 is bundled in the region of the MO layer 41b, where the magnetic field has been applied. The laser beam is bundled through the collimator lens 4, the polarizing beam splitter 3, and the first objective lens 2. The temperature of the MO layer 41b is thus raised over the Curie point to perform recording of the information signal.

In the first magneto-optical recording medium 41 shown in FIG. 3, the information signal is recorded in a recording density corresponding to the NA of the first objective lens 2 of the first optical system 1.

When the recorded information signal is reproduced, a laser beam having a lower intensity than that of the laser beam emitted during the recording mode is emitted by the laser diode 11 and is focused in the MO layer 41. The laser beam reflected in the MO layer 41b passes through the objective lens 2 and turns a right angle with the polarizing beam splitter 3. The beam is then led to the photodetector 12 through the cylindrical lens 5. Due to magneto-optical effect, the polarized direction of the reflected beam is changed in accordance with the direction of magnetization of the MO layer 41, so that reproduction is performed as the change of the polarized direction is detected by the photodetector 12.

Recording in the second magneto-optical recording medium 42 will be described below. As shown in FIG. 2, the magneto-optical recording medium 42 is mounted in such a manner that its transparent substrate 42a faces the second optical system 21. The magneto-optical recording medium 42 is rotated by the spindle motor 37. The objective lens 22 of the second optical system 21 is driven by a second drive system (not shown) to be displaced in the directions F and T like that of the first optical system 1. At that time, since the magnetic head 19 is formed integrally with the second objective lens 21, the magnetic head 19 is interlocked with the second optical system 21, but the first optical system and the first drive system are not operated.

At the same time, a magnetic field produced by the magnetic head 19 and modulated in response to the recording signal is applied to the MO layer 42b in the same manner that the recording is performed with the first optical system 1. In this case, the magnetic field produced by the magnetic head 19 is applied through the transparent substrate 42a. The laser beam radiated from the laser diode 31 is bundled in the region of the MO layer 42b, where the magnetic field has been applied. The laser beam is bundled through the collimator lens 24, the polarizing beam splitter 23, the second objective lens 22, and the light-transmitting optical glass 18. The temperature of the MO layer 42b is thus raised over the Curie point to perform recording of the information signal.

In the second magneto-optical recording medium 42 shown in FIG. 2, the NA of the objective lens 22 of the second optical system 21 is set larger than that of the first objective lens 2, so that the laser beam is bundled more in the MO layer 42b. Therefore, the information signal is recorded in higher density due to the larger NA.

The reproduction of the recorded information signal by the second optical system is the same as the reproduction by the first optical system, that is, the beam which is reflected in the MO layer 42b and whose direction of polarization is changed in accordance with the direction of magnetization of the MO layer 42b due to magneto-optical effect is led to the photodetector 32 through the optical glass 18, the second objective lens 22, the polarizing beam splitter 23, and the cylindrical lens 25. Thus, the reproduction is performed.

As described above, since the magnetic head 19 is available in common for both the media 41 and 42, the magneto-optical pickup can be made simple. Since the magnetic head 19 is driven together with the objective lens 22 in the directions F and T, the magnetic field applied to the MO layers 41b, 42b can be preferably kept constant by means of driving to displace the objective lens 22 in the focusing direction indicated in arrow F.

In recording with the first optical system 1, the second optical system 21 having the magnetic head 19 is also driven, but in recording and/or reproduction with the second optical system 21, the first optical system is not driven. As a method of automatically detecting such driving conditions, there is exemplified a method, in which it is detected whether or not a focus servo is started, and thereby, it is realized that the first magneto-optical recording medium is loaded when the focus servo is started, or the second magneto-optical recording medium is loaded when the focus servo is not started, because whenever the first magneto-optical recording medium is loaded, the first optical system is driven, and the focus servo is put in step-in action.

Another method is such that a detection hole is provided in a disc cartridge in which the magneto-optical recording medium is stored, and which of the magneto-optical recording media is loaded can be determined by means of detecting the detection hole.

According to the magneto-optical recording and/or reproducing apparatus of this invention, it is possible to record in and/or reproduce from either of the first magneto-optical recording medium 41 and the second magneto-optical recording medium 42 that can perform recording and/or reproduction in higher recording density as compared with the first magneto-optical recording medium 41.

Figure 5:
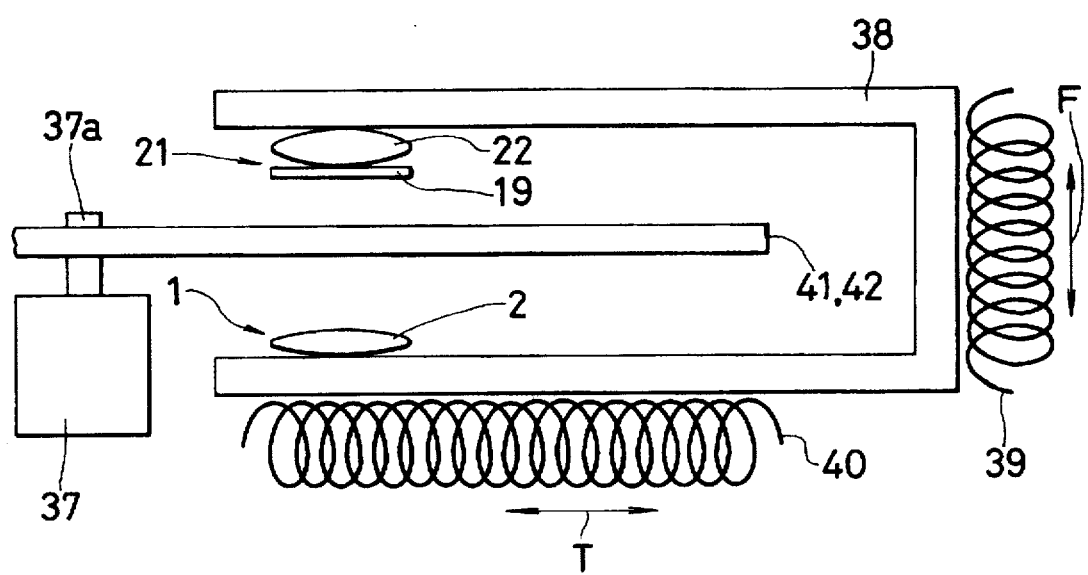
FIG. 5 is a side view of a main part of a modified magneto-optical recording and/or reproducing apparatus.

A modified magneto-optical recording and/or reproducing apparatus is shown in FIG. 5. The first objective lens 2 of the first optical system 1 and the second objective lens 22 of the second optical system 21 accompanied by the magnetic head 19 are stuck together in a grooved member 38. A focus coil 39 for driving the head in the direction F and a tracking coil 40 for driving the head in the direction T are provided on the grooved member 38. The coils 39 and 40, and a magnet (not shown) constitute a common drive system for the first and second optical systems 1 and 21.

To use the common drive system makes it possible to drive the first and second optical systems 1 and 21 simultaneously, and makes the drive system simple.

In each of the above embodiments, the magnetic head 19 is made under the magnetic field modulation scheme, but it may be made under the optical modulation scheme.

The magneto-optical recording and/or reproducing apparatus of the present invention has the first optical system and the second optical system, the numerical apertures of which are different from each other. Thus, if the two magneto-optical recording media have different recording density, it is possible to record in and/or reproduce from either of the two magneto-optical recording media, so that it will be a great convenience.

We claim:

1. A magneto-optical recording and/or reproducing apparatus for recording information signals on and/or reproducing recorded information signals from first and second magneto-optical recording media, said apparatus comprising:

first and second optical systems having first and second objective lenses, respectively, said first optical system for recording on and/or reproducing from the first magneto-optical medium and said second optical system for recording on and/or reproducing from the second magneto-optical medium, said second objective lens being arranged to face said first objective lens and having a numerical aperture which differs from that of said first objective lens, said first and second optical systems being arranged such that the respective one of said first and second magneto-optical media currently being subject to recording or reproducing is positioned between said first and second optical systems; and a magnetic head arranged near said second objective lens of the second optical system.

2. A magneto-optical recording and/or reproducing apparatus according to claim 1, wherein said numerical aperture of said second objective lens of the second optical system is larger than that of said first objective lens of the first optical system.

3. A magneto-optical recording and/or reproducing apparatus according to claim 1, wherein said magnetic head is arranged between said second objective lens of the second optical system and the respective magneto-optical recording medium currently subject to recording or reproduction so as to face said respective magneto-optical recording medium.

4. A magneto-optical recording and/or reproducing apparatus according to claim 3, wherein said magnetic head can transmit light during recording and reproduction.

5. A magneto-optical recording and/or reproducing apparatus according to claim 4, wherein said second objective lens of the second optical system is driven together with said magnetic head.

6. A magneto-optical recording and/or reproducing apparatus according to claim 5, wherein said second optical system and said magnetic head are simultaneously operated to record an information signal in said second magneto-optical recording medium.

7. A magneto-optical recording and/or reproducing apparatus according to claim 6, wherein said second magneto-optical recording medium has a plurality of layers including a transparent substrate and wherein said magnetic head is located adjacent to a surface of one of the layers of said second magneto-optical recording medium other than said transparent substrate.

8. A magneto-optical recording and/or reproducing apparatus according to claim 3, wherein said first optical system and said magnetic head are simultaneously driven to record an information signal in said first magneto-optical recording medium.

9. A magneto-optical recording and/or reproducing apparatus according to claim 3, wherein said first optical system and said magnetic head are synchronously driven to record an information signal in said first magneto-optical recording medium.

10. A magneto-optical recording and/or reproducing apparatus according to claim 9, wherein said first magneto-optical recording medium has a plurality of layers including a transparent substrate and wherein said magnetic head is located adjacent to a surface of one of the layers of said first magneto-optical recording medium other than said transparent substrate.

11. A magneto-optical recording and/or reproducing apparatus according to claim 1, wherein said first optical system and the second optical system are driven en bloc.

12. A magneto-optical recording and/or reproducing apparatus for recording information signals on and/or reproducing recorded information signals from first and second magneto-optical recording disks, each of said disks having a plurality of layers including a respective transparent substrate capable of transmitting light therethrough, said apparatus comprising:

first and second optical systems having first and second objective lenses, respectively, said first optical system for recording on and/or reproducing from the first magneto-optical disk and said second optical system for recording on and/or reproducing from the second magneto-optical disk, said second objective lens being arranged to face said first objective lens and having a numerical aperture which differs from that of said first objective lens, said first and second optical systems being arranged such that the respective one of said first and second magneto-optical media currently being subject to recording or reproducing is positioned between said first and second optical systems; and a magnetic head arranged near said second objective lens of the second optical system.

13. A magneto-optical recording and/or reproducing apparatus for recording information signals and/or reproducing recorded information signals, said apparatus comprising:

first and second magneto-optical recording media having respective transparent substrates capable of transmitting light which is utilized for recording and reproduction, said transparent substrate of the second magneto-optical recording medium having a thickness which is thinner than that of the first magneto-optical recording medium;

first and second optical systems having first and second objective lenses, respectively, said first optical system for recording on and/or reproducing from said first magneto-optical medium and said second optical system for recording on and/or reproducing from said second magneto-optical medium, said second objective lens being arranged to face said first objective lens and having a numerical aperture which is larger than that of said first objective lens, said first and second optical systems being arranged such that the respective one of said first and second magneto-optical media currently being subject to recording or reproducing is positioned between said first and second optical systems; and a magnetic head arranged near said second objective lens of the second optical system.

* * * * *